United States Patent
Lemon et al.

(10) Patent No.: US 10,142,291 B2
(45) Date of Patent: *Nov. 27, 2018

(54) SYSTEM FOR PROVIDING DNS-BASED POLICIES FOR DEVICES

(71) Applicant: Nominum, Inc., Redwood City, CA (US)

(72) Inventors: Edward Lemon, Brattleboro, VT (US); Brian Wellington, Fremont, CA (US); Robert Thomas Halley, Redwood City, CA (US); Srinivas Avirneni, Austin, TX (US); Keith Oborn, Hampshire (GB)

(73) Assignee: Nominum, Inc., Redwood City, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/668,561

(22) Filed: Aug. 3, 2017

(65) Prior Publication Data
US 2017/0331788 A1 Nov. 16, 2017

Related U.S. Application Data

(63) Continuation of application No. 14/832,935, filed on Aug. 21, 2015, now Pat. No. 9,742,811, which is a
(Continued)

(51) Int. Cl.
*H04L 29/06* (2006.01)
*H04L 29/12* (2006.01)
(Continued)

(52) U.S. Cl.
CPC ...... *H04L 63/0263* (2013.01); *G06F 21/6263* (2013.01); *G06Q 30/0255* (2013.01);
(Continued)

(58) Field of Classification Search
CPC ............ H04L 61/1511; H04L 63/1441; H04L 63/0218; H04L 63/1416
See application file for complete search history.

(56) References Cited

U.S. PATENT DOCUMENTS 6,233,618 B1 5/2001 Shannon
6,336,117 B1 1/2002 Massarani
(Continued)

OTHER PUBLICATIONS

GetSatisfaction.com, "Why does 'the token URL has not been whitelisted' message display when trying to signup or log in?", Retrieved: Feb. 9, 2015, Published: Nov. 11, 2010; available at: https://getsatisfaction.com/getsatisfaction/topics/why_does_the_token_url_has_not_been_whitelisted_message_display_when_trying_to_signup_or_login, 1 page.
(Continued)

*Primary Examiner* — Oleg Korsak

(57) ABSTRACT

A device control system is associated with individual devices connected through a network control point to a gateway and thereby to the Internet. The gateway inserts an EDNS0 pseudo resource record into an additional data section in each DNS query initiated by an individual device, the EDNS0 pseudo resource record identifying the initiating device. A dynamic policy enforcement engine in front of the DNS engine intercepts the DNS query, identifies the initiating device, and selects a policy that applies to the device. The dynamic policy enforcement engine may provide parental control and security service to the individual device by blocking the DNS query or passing it to the DNS engine according to the policy. A component that intercepts DNS queries may provide several additional types of services to the individual devices, including advertising, messaging, mobile device tracking, individual device application control, and delivery of individualized content.

20 Claims, 11 Drawing Sheets

Related U.S. Application Data continuation of application No. 14/745,183, filed on Jun. 19, 2015, now Pat. No. 9,992,234.

(51) Int. Cl.
*G06F 21/62* (2013.01)
*G06Q 30/02* (2012.01)

(52) U.S. Cl.
CPC ........ *H04L 61/1511* (2013.01); *H04L 63/102* (2013.01); *H04L 63/1441* (2013.01); *H04L 63/20* (2013.01); *G06F 2221/2115* (2013.01); *G06F 2221/2119* (2013.01); *G06F 2221/2141* (2013.01); *G06F 2221/2149* (2013.01)

(56) References Cited

U.S. PATENT DOCUMENTS

| | | |
|---|---|---|
| 7,591,002 B2 | 9/2009 | Shelest et al. |
| 8,583,801 B2 | 11/2013 | Wyatt et al. |
| 8,583,806 B2 | 11/2013 | Fleischman et al. |
| 8,826,443 B1 | 9/2014 | Raman et al. |
| 8,972,580 B2 | 3/2015 | Fleischman |
| 8,984,581 B2 | 3/2015 | Luna et al. |
| 9,026,597 B1 | 5/2015 | Emigh et al. |
| 9,191,393 B2 | 11/2015 | Tovar |
| 9,319,381 B1 | 4/2016 | Jones et al. |
| 9,467,461 B2 | 10/2016 | Balderas |
| 9,742,811 B2 | 8/2017 | Lemon et al. |
| 2001/0015965 A1 | 8/2001 | Preston et al. |
| 2002/0169865 A1 | 11/2002 | Tarnoff |
| 2003/0014659 A1 | 1/2003 | Zhu |
| 2003/0028622 A1 | 2/2003 | Inoue et al. |
| 2003/0065942 A1 | 4/2003 | Lineman et al. |
| 2003/0123465 A1 | 7/2003 | Donahue |
| 2003/0200442 A1 | 10/2003 | Bhat et al. |
| 2004/0103318 A1 | 5/2004 | Miller et al. |
| 2004/0111519 A1 | 6/2004 | Fu et al. |
| 2005/0022229 A1 | 1/2005 | Gabriel et al. |
| 2005/0105513 A1 | 5/2005 | Sullivan et al. |
| 2005/0277445 A1 | 12/2005 | Bae |
| 2006/0136595 A1 | 6/2006 | Satyavolu |
| 2006/0173793 A1 | 8/2006 | Glass |
| 2007/0118669 A1 | 5/2007 | Rand et al. |
| 2007/0143827 A1 | 6/2007 | Nicodemus et al. |
| 2007/0220145 A1 | 9/2007 | Kozakura et al. |
| 2007/0294419 A1 | 12/2007 | Ulevitch |
| 2008/0155067 A1 | 6/2008 | Rivera |
| 2008/0208868 A1 | 8/2008 | Hubbard |
| 2008/0209057 A1 | 8/2008 | Martini et al. |
| 2009/0100513 A1 | 4/2009 | Coburn |
| 2009/0157889 A1* | 6/2009 | Treuhaft ............ H04L 29/12066 709/230 |
| 2009/0164597 A1 | 6/2009 | Shuster |
| 2009/0182843 A1 | 7/2009 | Hluchyj et al. |
| 2010/0031338 A1 | 2/2010 | Poore et al. |
| 2010/0131646 A1 | 5/2010 | Drako |
| 2010/0154024 A1 | 6/2010 | Boxmeyer et al. |
| 2011/0231927 A1* | 9/2011 | Tovar .................... G06F 21/305 726/12 |
| 2012/0054266 A1 | 3/2012 | Kazerani et al. |
| 2012/0254996 A1 | 10/2012 | Wilbourn et al. |
| 2015/0058488 A1 | 2/2015 | Backholm |
| 2015/0288721 A1 | 10/2015 | Lemon et al. |
| 2015/0365441 A1 | 12/2015 | Lemon et al. |
| 2016/0072847 A1 | 3/2016 | Bremen et al. |

OTHER PUBLICATIONS

Contavalli et al., Client IP information in DNS requests draft-vandergaast-edns-client-ip-00, Jan. 26, 2010, 20 pages.

Imielinski, T., et al., "GPS/Based Addressing and Routing," Network Working Group Request for Comments: 2009, Nov. 1996, 27 pages.

* cited by examiner

SYSTEM FOR PROVIDING DNS-BASED POLICIES FOR DEVICES

CROSS-REFERENCE TO RELATED APPLICATIONS

The present application is a continuation of, and claims the priority benefit of, U.S. patent application Ser. No. 14/832,935 filed on Aug. 21, 2015 and entitled "System for Providing DNS-Based Control of Individual Devices," which in turn is a continuation of, and claims the priority benefit of, U.S. patent application Ser. No. 14/745,183 filed on Jun. 19, 2015 and entitled "System for Providing DNS-Based Control of Individual Devices," which are incorporated by reference in their entirety herein.

TECHNICAL FIELD

This disclosure relates generally to data processing, and more specifically to a system for providing DNS-based control of individual devices.

BACKGROUND

Groups of Internet users such as households and offices often have several individual computing devices ("individual devices") attached to the Internet through a gateway. The individual devices may be a variety of types, such as personal computers, gaming devices, and tablets.

There is a need to exercise control over the users' devices for many purposes. One purpose is parental control, in which a household's parents regulate their children's Internet use. Another purpose is security, in which users are prevented from visiting sites or performing operations that are considered dangerous.

One type of existing device control technology has utilized device control software that runs on each individual device. Such technology has several disadvantages. It complicates the task of installing and configuring the device control software by distributing it over many devices. It requires a provider to provide, and a user to install, a different implementation of device control software for each type of device. It has the potential for a user to evade control entirely by disabling the device control software on the user's own device, or by gaining access to the Internet through a device on which device control software has not been installed.

Another type of existing device control technology has utilized software that runs on the gateway. Such software is often limited in function because the memory and computing power on a gateway device typically is limited.

Another type of existing device control technology has utilized software that runs on a server through which the gateway gains access to the Internet. Such software typically cannot distinguish among the individual devices that communicate through the gateway, and so it cannot apply different controls to individual devices.

There exists a need for device control technology that runs in a central location, cannot be evaded by users of individual devices, and can distinguish among devices in order to apply different controls individually.

SUMMARY OF THE DISCLOSURE

This summary is provided to introduce a selection of concepts in a simplified form that are further described in the Detailed Description below. This summary is not intended to identify key features or essential features of the claimed subject matter, nor is it intended to be used as an aid in determining the scope of the claimed subject matter.

In a device control system designed according to the present disclosure, the gateway attaches a unique identifier to DNS messages originated by each individual device that is served by a gateway. The unique identifier may consist of a gateway identifier and a device identifier. The gateway identifier is fixed for each gateway. The unique identifier may be contained in pseudo-resource-records according to the EDNS0 standard.

The device identifier is easy for the gateway to obtain because the gateway has access to all of the headers and other control information in messages exchanged between the gateway and the individual devices under its control. Thus the software that needs to be added to the gateway to enable the device control system is simple and has a small footprint.

Device control is performed by a software module associated with the DNS server that responds to DNS messages forwarded by the gateway. In some embodiments of the device control software, the software module is associated with a memory device which holds a plurality of policies. The policies control the software module's treatment of the individual devices attached to the gateway. The policies may be configured by a person with authority over the individual devices, such as a parent or a system administrator, through an individual device that can communicate with the software module.

A device control system designed according to the present disclosure may be used to implement parental control over individual devices attached to a gateway in a household. It may also be used to provide security to the individual devices in a household, office, or other location. It may also be used to deliver messages to individual devices, to insert advertising content into the data stream delivered to individual devices, to track the locations of individual devices, and for other purposes.

BRIEF DESCRIPTION OF THE DRAWINGS

Embodiments are illustrated by way of example, and not by limitation, in the figures of the accompanying drawings, in which like references indicate similar elements.

DETAILED DESCRIPTION

The following detailed description includes references to the accompanying drawings, which form a part of the detailed description. The drawings show illustrations in accordance with example embodiments. These example embodiments, which are also referred to herein as "examples," are described in enough detail to enable those skilled in the art to practice the present subject matter. The embodiments can be combined, other embodiments can be utilized, or structural, logical, and electrical changes can be made without departing from the scope of what is claimed. The following detailed description is therefore not to be taken in a limiting sense, and the scope is defined by the appended claims and their equivalents. In this document, the terms "a" and "an" are used, as is common in patent documents, to include one or more than one. In this document, the term "or" is used to refer to a nonexclusive "or," such that "A or B" includes "A but not B," "but not A," and "A and B," unless otherwise indicated.

The present disclosure describes a device control system which exercises control over individual devices which communicate with the Internet through a gateway.

"Individual device" is used herein to refer to any computing device that is capable of communicating through the Internet and delivering communicated content to an individual user. An individual device may be a personal computer (PC), a smartphone, a gaming console, a tablet, or a phablet.

"Gateway" is used herein to refer to any connection point at the edge of a network through which at least one household, office, or other location connects at least one individual device to the Internet. A gateway may be fixed or mobile.

"Network control point" is used herein to refer to any network which connects a gateway to the associated individual devices. A local area network is an example of a network control point. A network control point is not necessarily constrained to operate in a fixed location or a limited physical locality.

"Wide area network" and "WAN" are used herein to refer to any network which connects at least one gateway to at least one server. The Internet is an example of a wide area network.

Figure 1:
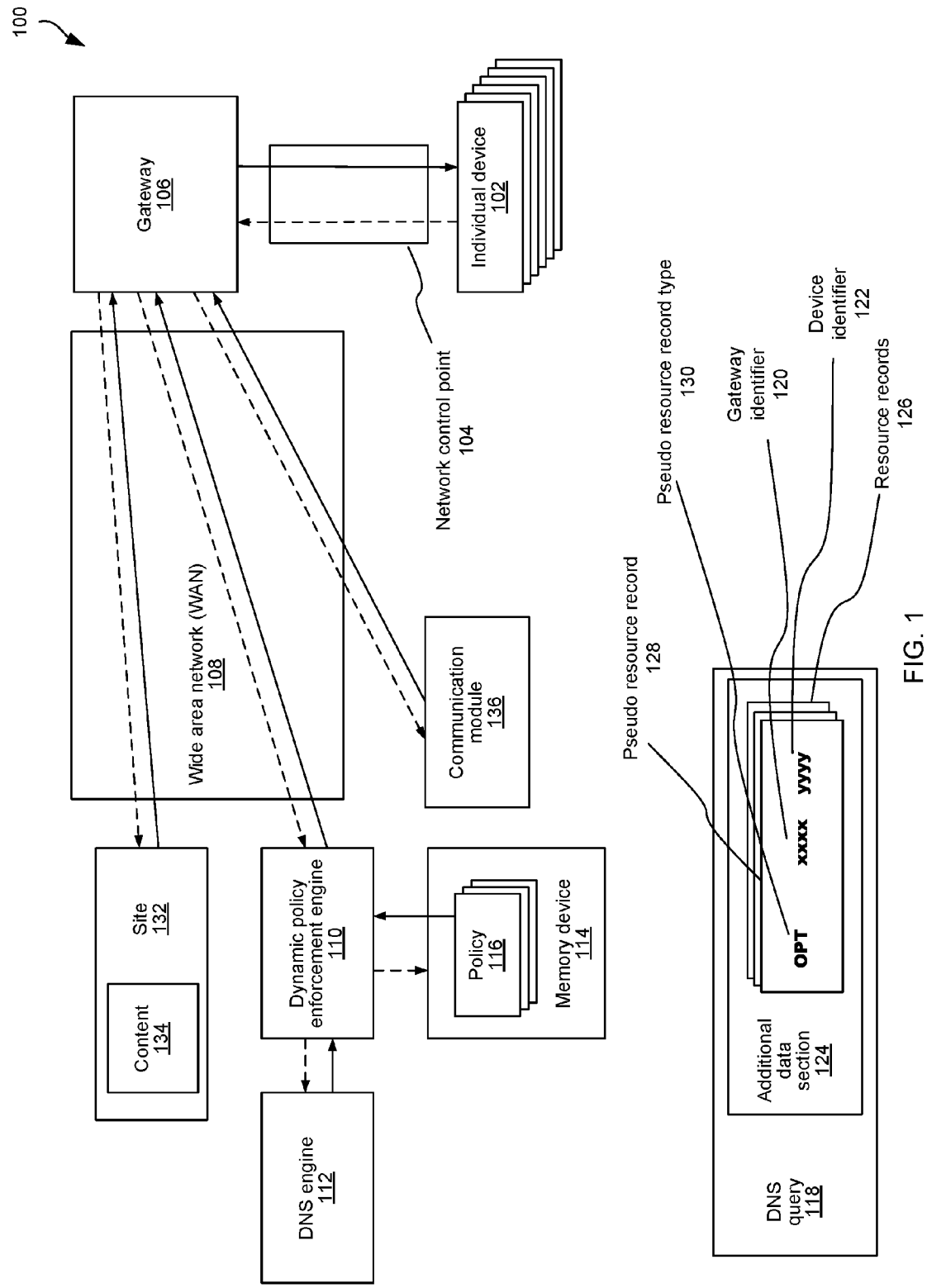
FIG. 1 shows a system for providing DNS-based control of individual devices and the structure of a DNS query employed by the system.

Referring now to the drawings, FIG. 1 illustrates a device control system 100 designed according to an embodiment of the device control system and a DNS record utilized by the device control system 100. At least one individual device 102 is connected through a network control point 104 to a gateway 106. The gateway 106 is connected through a wide area network 108 to a dynamic policy enforcement engine 110. The dynamic policy enforcement engine 110 communicates with a DNS engine 112 and with a memory device 114 which holds a plurality of policies 116 which may apply to different individual devices 102. The dynamic policy enforcement engine 110, the DNS engine 112, and the memory device 114 may each run on a dedicated server, on a shared server, or in a computing cloud.

An individual device 102 sends a DNS query 118 to the DNS engine 112 when it needs to resolve a domain name to an IP address. The DNS query 118 passes through the network control point 104, the gateway 106, the wide area network 108, and the dynamic policy enforcement engine 110.

A unique gateway identifier 120 is assigned to each gateway 106 that communicates with the dynamic policy enforcement engine 110. The gateway identifier 120 may be permanently assigned when the gateway 106 is manufactured, or may be assigned dynamically when the gateway 106 is recognized by the dynamic policy enforcement engine 110. The gateway identifier 120 may include an identifier associated with the gateway 106's location on the wide area network 108, such as the gateway 106's IP address.

A unique device identifier 122 is associated with each individual device 102 that is associated with a given gateway 106. The device identifier 122 may be permanently assigned when the individual device 102 is manufactured. Alternatively, the device identifier 122 may be derived from a property of the individual device 102's location on the network control point 104, such as an internal IP address or a MAC address.

The additional data section 124 may contain one or more resource records 126, some of which may be pseudo resource records (pseudo-RRs). The gateway 106 inserts into the additional data section 124 a pseudo-RR 128 whose pseudo resource record type 130 is OPT, identifying it as an EDNS0 pseudo-RR. The gateway 106 inserts the gateway identifier 120 and the device identifier 122 into the pseudo-RR 128, uniquely identifying the individual device 102 which originated the DNS query 118.

When the dynamic policy enforcement engine 110 receives the DNS query 118, it extracts the pseudo-RR 128 from the additional data section 124 and uses the gateway identifier 120 and device identifier 122 to select a policy 116 which applies to the individual device 102 which originated the DNS query 118. The dynamic policy enforcement engine 110 then processes the DNS query 118 according to the selected policy 116. Depending on the contents of the policy 118, the dynamic policy enforcement engine 110 may pass the DNS query 118 to the DNS engine 112, pass a modified version of the DNS query 118 to the DNS engine 112, block the DNS query 118 from the DNS engine 112 and return its own response to the individual device 102, or block the DNS query 118 from the DNS engine 112 and return no response to the individual device 102. If the dynamic policy enforcement engine 110 passes the original DNS query 118 or a modified DNS query to the DNS engine 112, it may return the DNS engine 112's response, return a modified version of the DNS engine 112's response, block the response and send its own response, or block the response and send no response.

If the dynamic policy enforcement engine 110 blocks the DNS query 118, blocks the DNS engine 112's response, or modifies the DNS query 118 or the DNS engine 112's response, it may prevent the individual device 102 from obtaining the IP address of a site 132 which is the object of the DNS query 118, effectively blocking the individual device 102 from access to content 134 of the site 132.

In some embodiments, the device control system 100 may deliver content to an individual device 102, as distinguished from directing the individual device 102 to content on other servers. In such embodiments, a communication module 136 affords access to content provided by the device control system 100.

Figure 2:
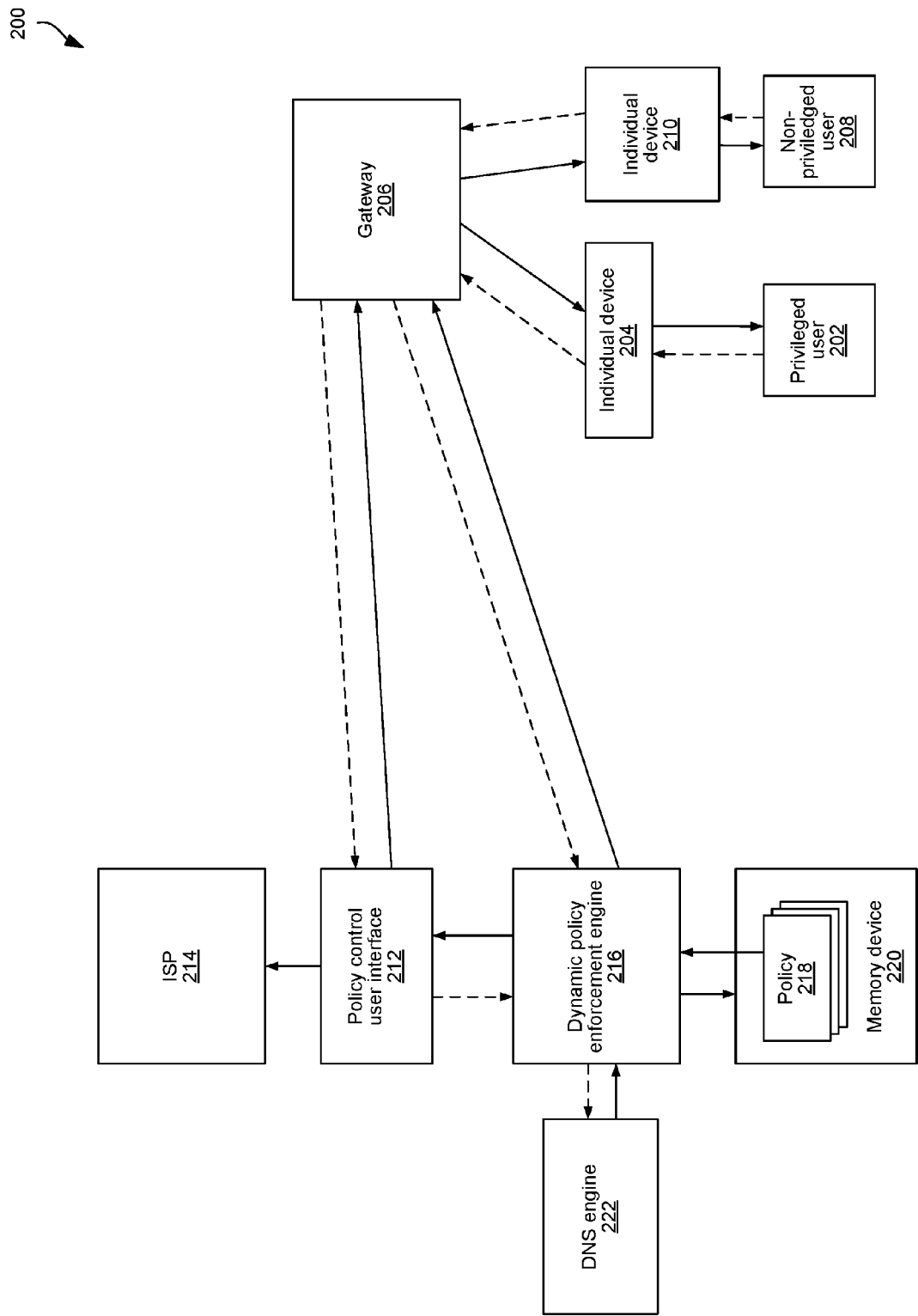
FIG. 2 shows the operation of a user interface to the system for providing DNS-based control of individual devices, by means of which a privileged user may exercise control over a policy that governs an individual device's access to content servers.

FIG. 2 shows an embodiment 200 of the device control system in which policies that control the dynamic policy enforcement engine may be created and maintained. At least one privileged user 202 uses an individual device 204 which is associated with a gateway 206. One or more non-privileged users 208 may use individual devices 210 which are also associated with the gateway 206. The privileged user 202 communicates with a policy control user interface 212. The policy control user interface 212 may be implemented as an application on a web server operated by an Internet service provider (ISP) 214. The policy control user interface 212 may communicate with the gateway 206, the ISP 214, or a dynamic policy enforcement engine 216.

The policy control user interface 212 may permit the privileged user 202 to create and maintain policies 218 that apply to users of individual devices 204, 210 associated with the gateway 206, including the privileged user 202 him or herself, other privileged users 202, and non-privileged users 208. The policies 218 are stored in a memory device 220. The policy control user interface 212 may create and maintain the policies 218 by operating directly on the memory device 220, or by communicating with the dynamic policy enforcement engine 216 which operates on the memory device 220.

In other embodiments the policy control user interface 212 may include a gateway interface, an ISP interface, or a DNS interface, which respectively communicate with the gateway 206, the ISP 214, or a DNS engine 222. The policy control user interface 212 may create and maintain policies 218 by respectively setting one or more flags on the gateway interface, the ISP interface, or the DNS interface.

Figure 3:
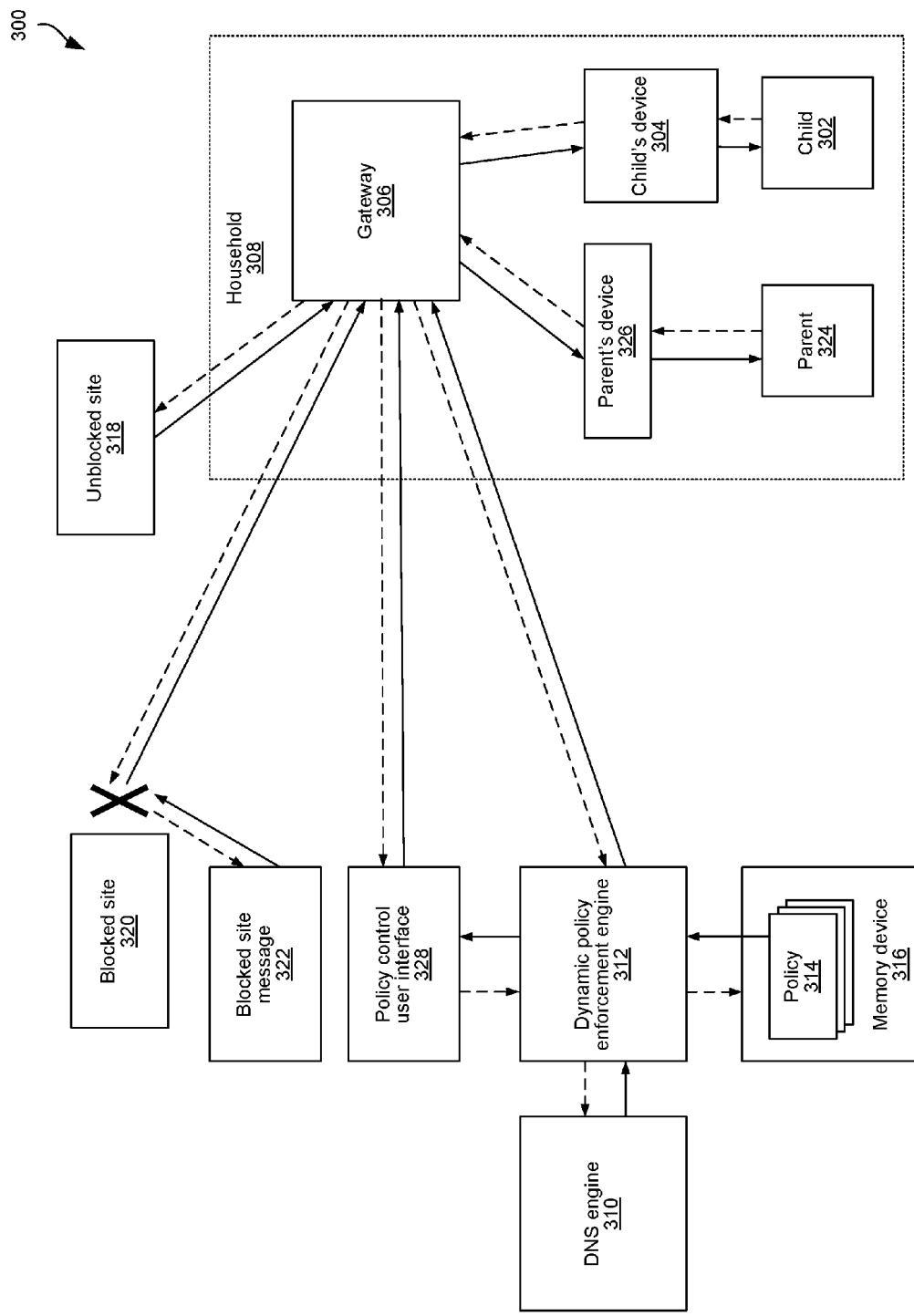
FIG. 3 shows a parental control application of the device control system in which a policy permits or blocks access to a site by an individual device.

FIG. 3 shows an embodiment 300 of the device control system which is adapted to parental control. One or more children 302 use one or more child's devices 304 to communicate through a gateway 306 which is associated with a household 308. Each DNS query from a child's device 304 to a DNS engine 310 passes through a dynamic policy enforcement engine 312, which selects a policy 314 which applies to that child's device 304 from a memory device 316.

If the selected policy 314 indicates that the child's device 304's DNS query refers to an unblocked site 318, the dynamic policy enforcement engine 312 may pass the DNS query to the DNS engine 310 and return the DNS engine 310's response to the child's device 304. The child's device 304 may then request content from the unblocked site 318.

If the selected policy 314 indicates that the child's device 304's DNS query refers to a blocked site 320, the dynamic policy enforcement engine 312 may take action which denies the child 302 access to the blocked site 320. For example, it may return a response to the DNS query which redirects the child's device 304 to a web page that contains a blocked site message 322, or to an alternative site that is not blocked. Alternatively, it may block the DNS query from the DNS engine 310 and send no response.

The dynamic policy enforcement engine 312 may operate on responses from the DNS engine 310 instead of or in addition to operating on DNS queries to the DNS engine 310. For example, the dynamic policy enforcement engine 312 may block responses that contain a certain IP address or an IP address in a certain range, instead of or in addition to blocking DNS queries that contain certain domain names.

Parental control is exercised by one or more parents 324 using parent's devices 326 which communicate with a policy control user interface 328. The policy control user interface 328 creates and maintains policies 314 for the parents 324 and stores them in the memory device 316.

Figure 4:
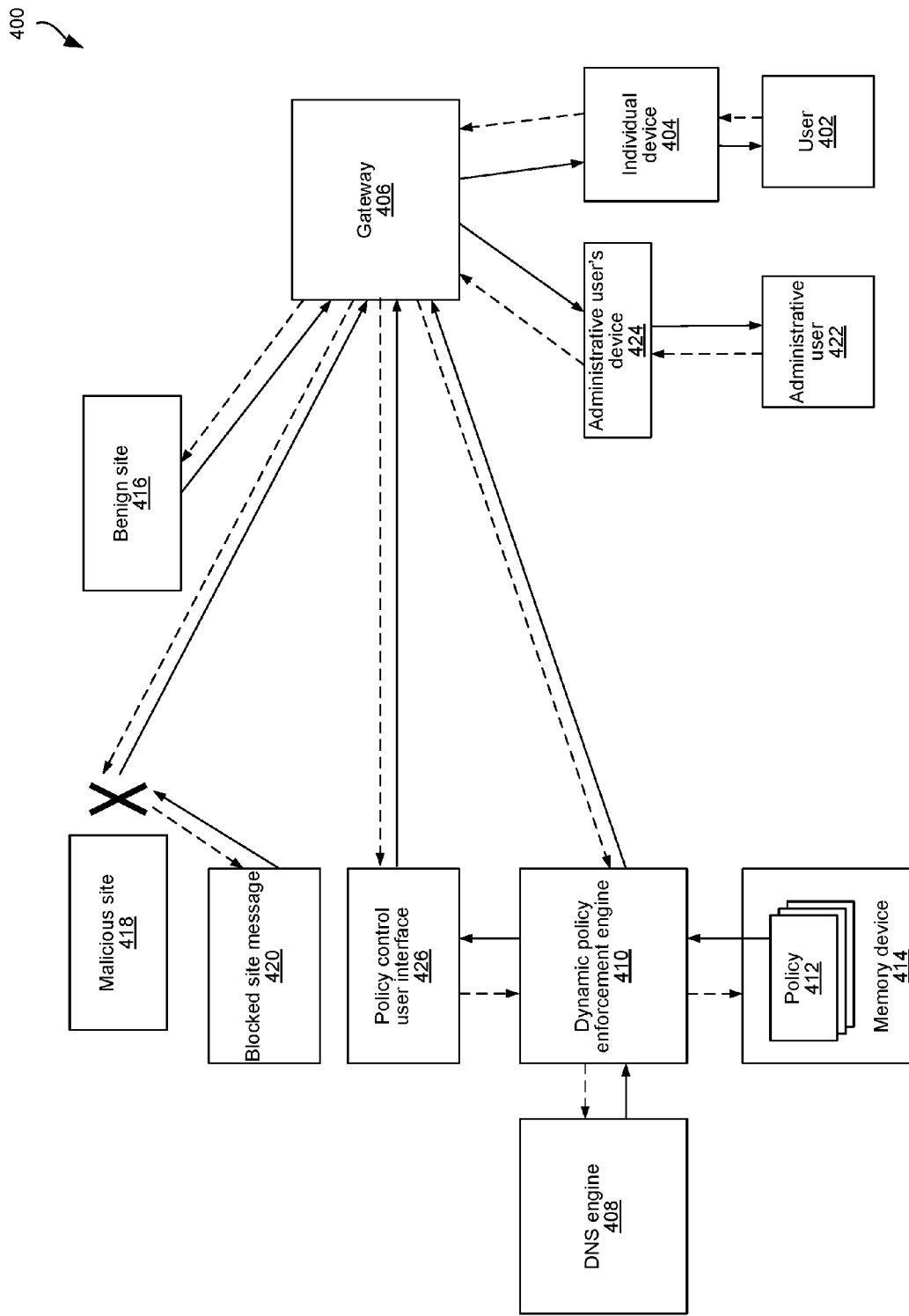
FIG. 4 shows a subscriber security application of the device control system in which a policy protects devices from malicious sites on an individualized basis.

FIG. 4 shows an embodiment 400 of the device control system which is adapted to provide security to users. One or more users 402 use one or more individual devices 404 to communicate through a gateway 406. Each DNS query from an individual device 404 to a DNS engine 408 passes through a dynamic policy enforcement engine 410, which selects a policy 412 which applies to that individual device 404 from a memory device 414. The dynamic policy enforcement engine 410 uses the policy 412 to determine whether a site 416, 418 that is the object of the DNS request is a benign site 416 or a malicious site 418. A malicious site 418 may be characterized by content that includes malware, by phishing, or by executing attacks on users or on other sites.

If the selected policy 412 indicates that the individual device 404's DNS query refers to a benign site 416, the dynamic policy enforcement engine 410 may pass the DNS query to the DNS engine 408 and return the DNS engine 408's response to the individual device 404. The individual device 404 may then request content from the benign site 416.

If the selected policy 412 indicates that the individual device 404's DNS query refers to a malicious site 418, the dynamic policy enforcement engine 410 may take action which denies the user 402 access to the malicious site 418. For example, it may return a response to the DNS query which redirects the individual device 404 to a web page that contains a blocked site message 420, or to a benign alternative site. Alternatively, it may block the DNS query from the DNS engine 408 and send no response.

The dynamic policy enforcement engine 410 may operate on responses from the DNS engine 408 instead of or in addition to operating on DNS queries to the DNS engine 408. For example, the dynamic policy enforcement engine 410 may block DNS responses that contain a certain IP address or an IP address in a certain range, instead of or in addition to blocking DNS queries that contain certain domain names.

Administrative control is exercised by one or more administrative users 422 using administrative user's devices 424 which communicate with a policy control user interface 426. The policy control user interface 426 creates and maintains policies 412 for the administrative users 422 and stores them in the memory device 414.

Figure 5:
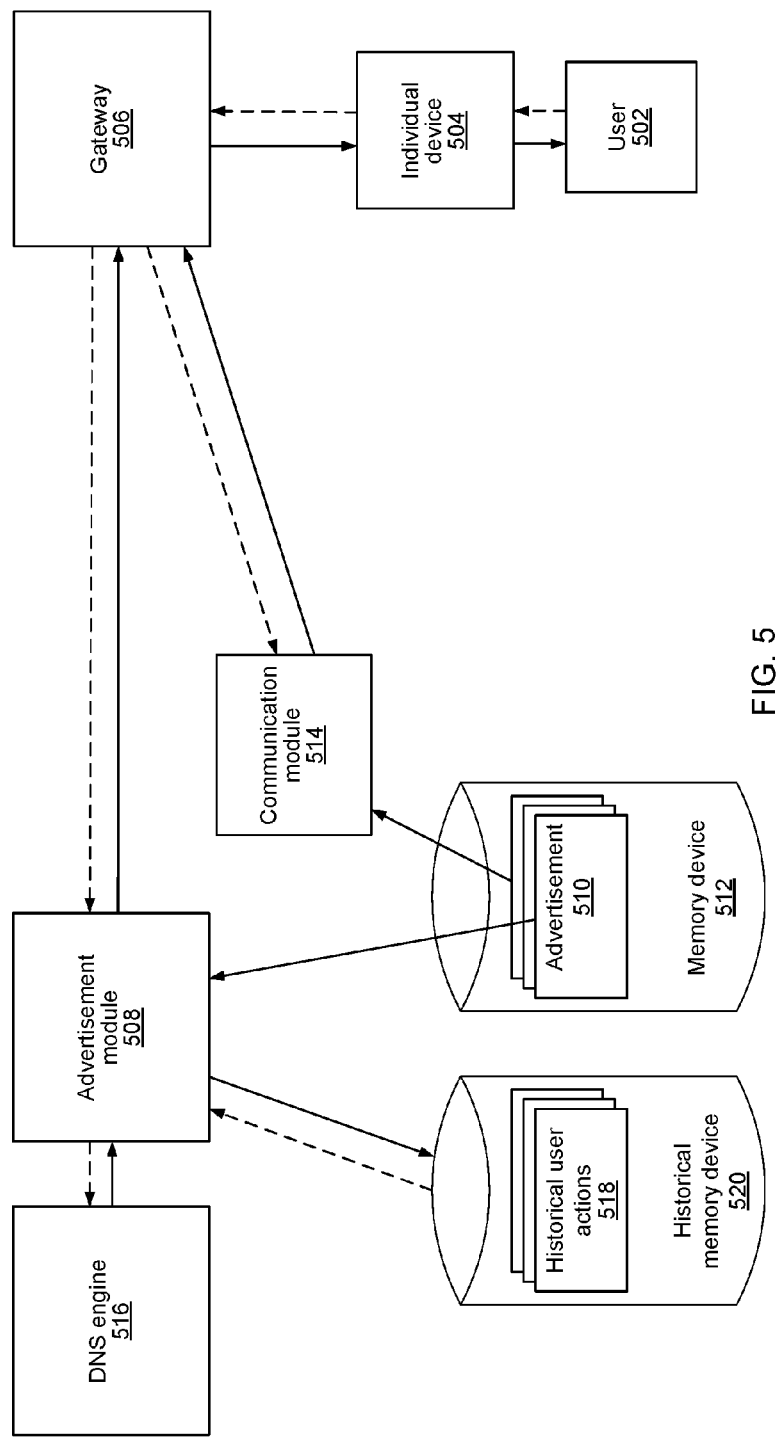
FIG. 5 shows an advertising delivery application of the device control system in which a policy causes advertising content to be delivered to an individual device.

FIG. 5 shows an embodiment 500 of the device control system which is adapted to deliver advertisement content to users. One or more users 502 use one or more individual devices 504 to communicate through a gateway 506. An advertisement module 508 receives a first DNS query from an individual device 504 and selects an advertisement 510 from a memory device 512, the selected advertisement 510 to be delivered to the individual device 504.

The advertisement module 508 may return a DNS response to the individual device 504 which causes the individual device 504 to load the advertisement 510 from a communication module 514 instead of loading the page requested by the first DNS query. The communication module 514 retrieves the advertisement 510 from the memory device 512 and returns it to the individual device 504.

The advertisement 510 may include a hyperlink or other control which the user 502 may select to load the page which the individual device 504 requested in the first DNS query. When the user 502 selects the hyperlink or other control the individual device 504 may send a second DNS query to the advertisement module 508. The second DNS query may contains a URL which the advertisement module 508 recognizes as a request originated by an advertising page as distinguished from a request originated by the user 502. The advertisement module 508 accordingly passes a DNS query to a DNS engine 516 and returns the DNS engine 516's response to the individual device 504. The DNS query which the advertisement module 508 passes to the DNS engine 516 may be the first DNS query, or may be an equivalent of the first DNS query which the advertisement module 508 reconstructs from the second DNS query.

The advertisement module 508's selection of the advertisement 510 may be based at least in part on historical user actions 518. Historical user actions 518 may include actions such as issuing DNS queries for particular types of content and indicating approval or disapproval of advertisements 510 by selecting hyperlinks or other controls which may be included in the advertisements 510 for that purpose. The advertisement module 508 may store historical user actions 518 in a historical memory device 520 and subsequently refer to them when selecting advertisements 510.

Figure 6:
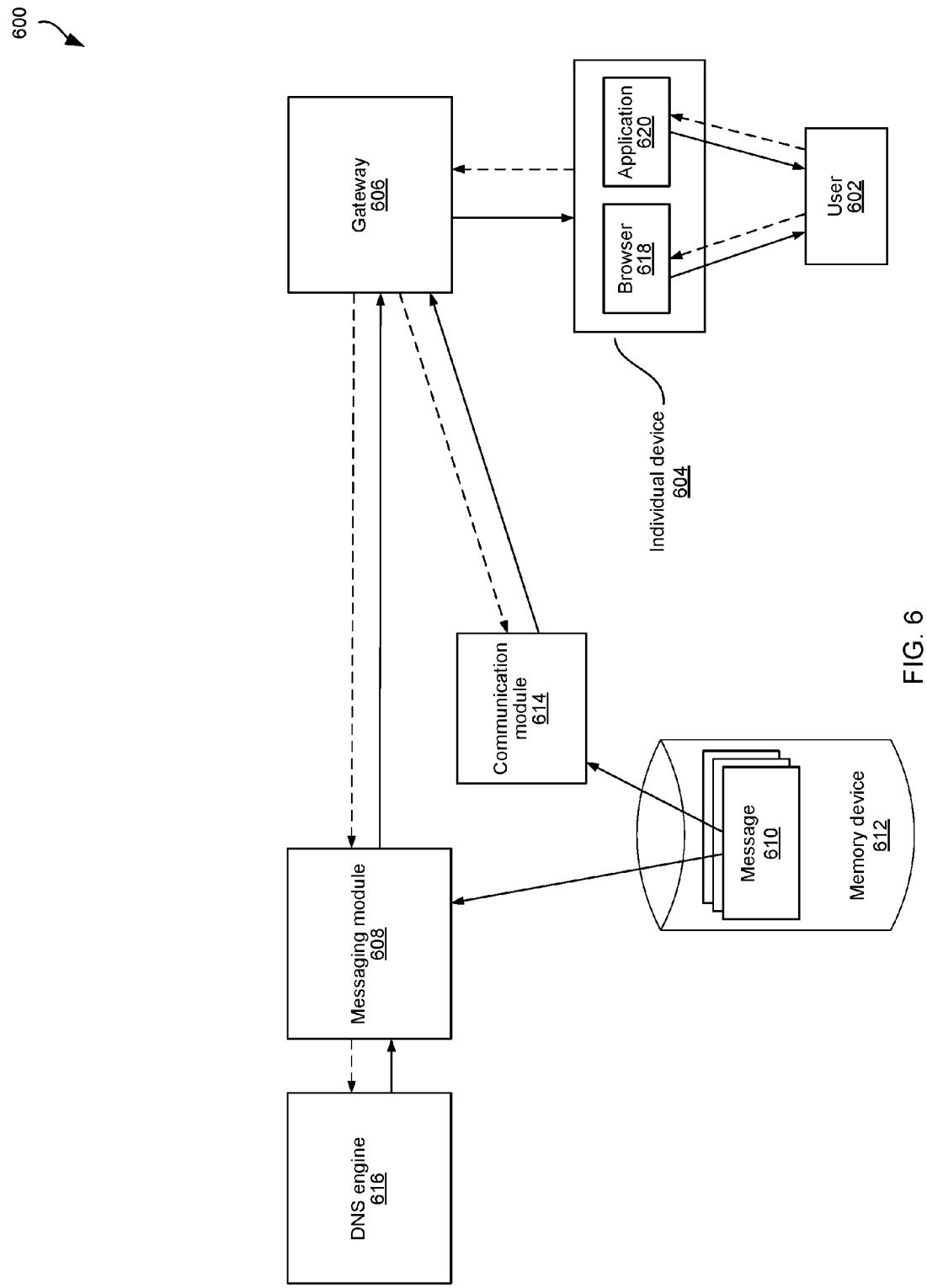
FIG. 6 shows a messaging application of the device control system in which a policy causes a message to be delivered to an individual device.

FIG. 6 shows an embodiment 600 of the device control system which is adapted to deliver messages to users. One or more users 602 use one or more individual devices 604 to communicate through a gateway 606. A messaging module 608 receives a first DNS query from an individual device 604 and selects a message 610 from a memory device 612, the selected message 610 to be delivered to the individual device 604. The messages 610 may be addressed to specific users 602 of individual devices 604.

The messaging module 608 returns a DNS response to the individual device 604 which causes the individual device 604 to load the selected message 610 from a communication module 614 instead of loading the page requested by the first DNS query. The communication module 614 retrieves the selected message 610 from the memory device 612 and returns it to the individual device 604. The user 602 may view the message via a browser 618 or via an application 620 associated with the individual device 604.

The message 610 may include a hyperlink or other control which the user 602 may select to load the page which the individual device 604 requested in the first DNS query. The hyperlink or other control may cause the individual device 604 to send a second DNS query to the messaging module 608. The second DNS query may contain a URL which the messaging module 608 recognizes as a request originated by a message page as distinguished from a request originated by the user 602. The messaging module 608 accordingly passes a DNS query to the DNS engine 616 and returns the DNS engine 616's response to the individual device 604. The DNS query which the messaging module 608 passes to the DNS engine 616 may be the first DNS query, or may be an equivalent of the first DNS query which the messaging module 608 reconstructs from the second DNS query.

Figure 7:
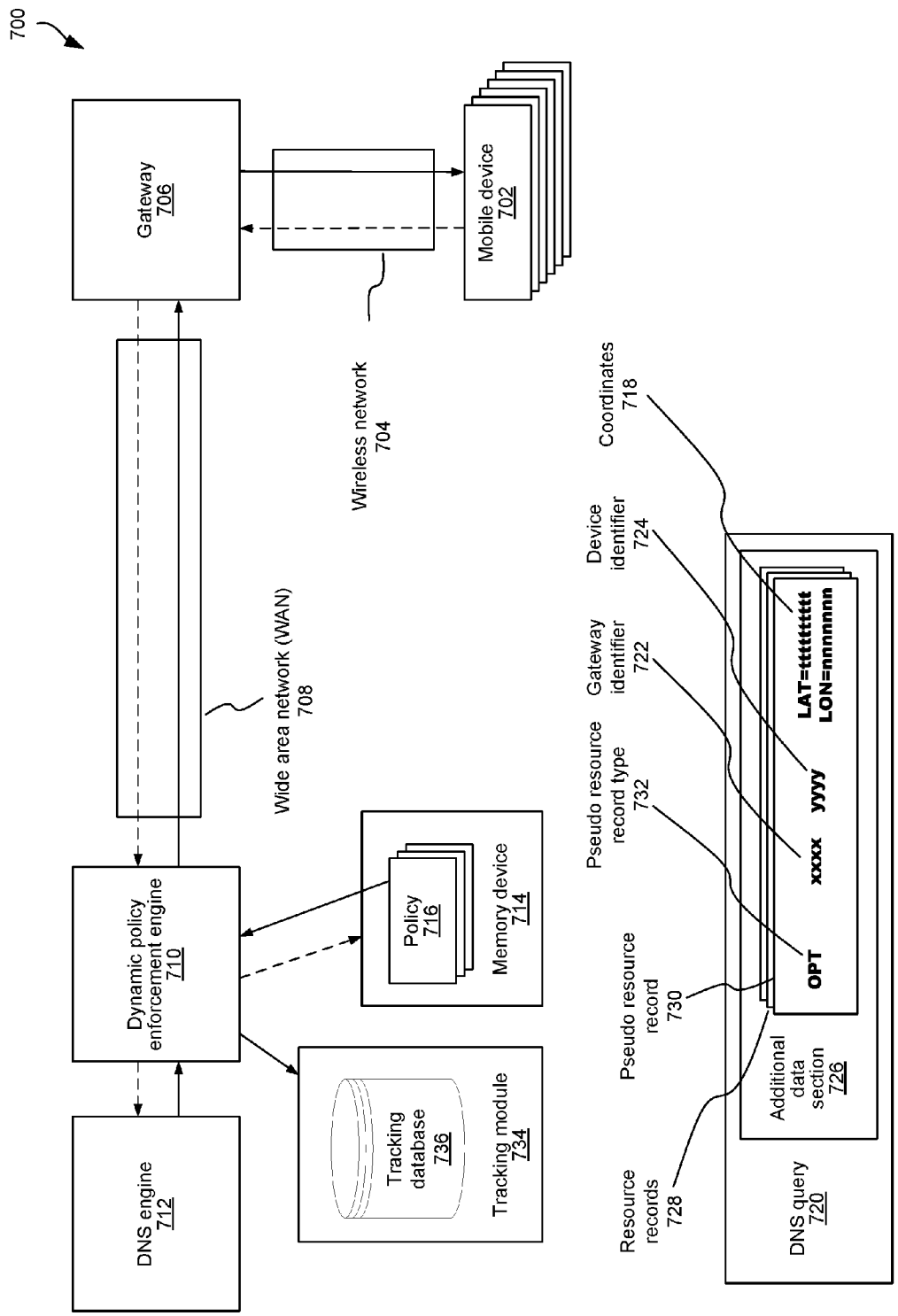
FIG. 7 shows a mobile device tracking application of the device control system.

FIG. 7 shows an embodiment 700 of the device control system which is adapted to track mobile devices. One or more mobile devices 702 communicate through a wireless network 704 to a gateway 706. The wireless network 704 may consist of one or more WiFi connections between the gateway 706 and the respective mobile devices 702. The gateway 706 may be a mobile device such as a mobile hotspot. The gateway 706 is connected through a wide area network 708 to a dynamic policy enforcement engine 710. The dynamic policy enforcement engine 710 communicates with a DNS engine 712, and may also communicate with a memory device 714 which holds a plurality of policies 716 which apply to different mobile devices 702.

A mobile device 702 periodically reports its coordinates 718 to the gateway 706. The coordinates 718 may be obtained from GPS data.

The mobile device 702 sends a DNS query 720 to the DNS engine 712 when it needs to resolve a domain name to an IP address. The DNS query 720 passes through the wireless network 704, the gateway 706, the wide area network 708, and the dynamic policy enforcement engine 710.

A unique gateway identifier 722 is assigned to each gateway 706 that communicates with the dynamic policy enforcement engine 710. The gateway identifier 722 may be permanently assigned when the gateway 706 is manufactured. Alternatively, the gateway identifier 722 may be derived from a property of the gateway 706's location on the wide area network 708.

A unique device identifier 724 is associated with each mobile device 702 that is associated with the gateway 706. The device identifier 724 may be permanently assigned when the mobile device 702 is manufactured. Alternatively, the device identifier 724 may be derived from a property of the mobile device 702's location on the wireless network 704.

Each DNS query 720 transmitted over the wide area network 708 by the gateway 706 contains an additional data section 726. The gateway 706 inserts an additional data section 726 in each DNS query 720 if none is present in the DNS query 720 received from the mobile device 702. The additional data section 726 may contain one or more resource records 728, some of which may be pseudo resource records (pseudo-RRs). The gateway 706 inserts into the additional data section 726 a pseudo-RR 730 whose pseudo resource record type 732 is OPT, identifying it as an EDNS0 pseudo-RR. The gateway 706 inserts the gateway identifier 722 and the device identifier 724 into the pseudo-RR 730, uniquely identifying the mobile device 702 which originated the DNS query 720. The gateway 706 further inserts the mobile device 702's coordinates 718 into the pseudo-RR 730, identifying the mobile device 702's location.

When the dynamic policy enforcement engine 710 receives the DNS query 720 from the gateway 706 it selects a policy 716 which applies to the originating mobile device 702 from the memory device 714.

If the selected policy 716 indicates that the mobile device 702 is to be tracked, the dynamic policy enforcement engine 710 extracts the mobile device 702's coordinates 718 from the DNS query 720 and passes them to a tracking module 734, which stores them in a tracking database 736.

In another embodiment the dynamic policy enforcement engine 710 determines whether and when to store tracking data without reference to a policy 716. This embodiment does not use a memory device 714 or policies 716.

Figure 8:
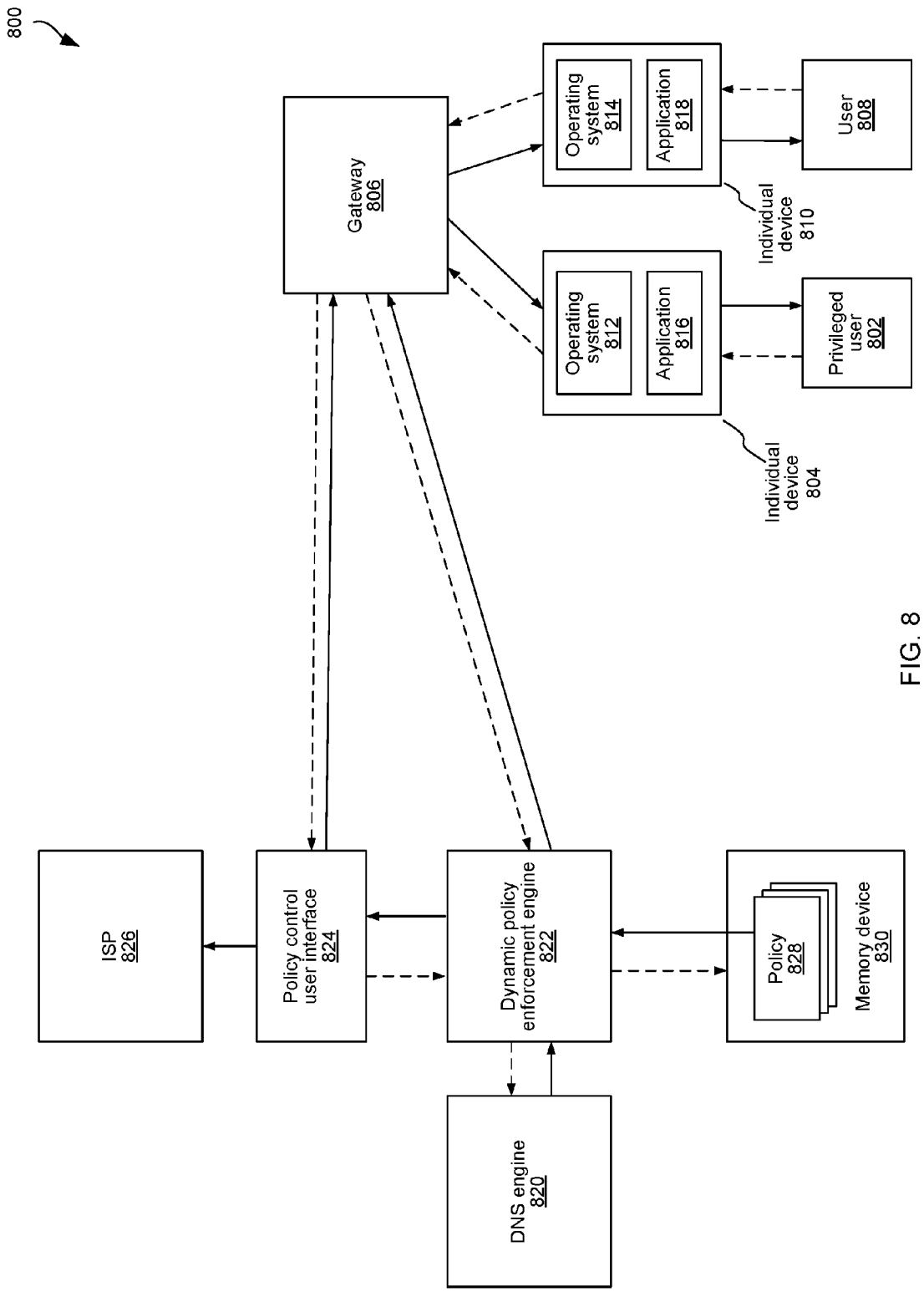
FIG. 8 shows a device control application of the device control system in which a policy causes the system to exercise a control function on an individual device or an application that runs on an individual device.

FIG. 8 shows an embodiment 800 of the device control system which provides control of individual devices and applications that run on individual devices. At least one privileged user 802 uses an individual device 804 which is associated with a gateway 806. Additional non-privileged users 808 may use individual devices 810 which are also associated with the gateway 806. The individual devices 804, 810 may each run an operating system 812, 814, and may each run one or more applications 816, 818.

When an individual device 804, 810 sends a DNS query to a DNS engine 820, the gateway 806 inserts a DNS0 pseudo-RR into the DNS query in the manner shown in FIG.

1 and explained in the description of FIG. 1, thereby enabling a dynamic policy enforcement engine 822 to identify the individual device 804, 810 that originated the DNS query.

The privileged user 802 communicates with a policy control user interface 824. The policy control user interface 824 may be implemented as an application on a web server operated by an Internet service provider (ISP) 826. The policy control user interface 824 can also communicate with the dynamic policy enforcement engine 822.

The policy control user interface 824 may permit the privileged user 802 to create and maintain policies 828 which apply to one or more individual devices 804, 810. The policies 828 are stored in a memory device 830. The policy control user interface 824 may create and maintain the policies 828 by operating directly on the memory device 830, or by communicating with the dynamic policy enforcement engine 822 which operates on the memory device 830.

The dynamic policy enforcement engine 822 controls aspects of the operation of an individual device 804, 810 by selecting the policy 828 that applies to the individual device 804, 810. Aspects of the operation of an individual device 804, 810 which the policy 828 may control include the operating system 812, 814 of the individual device 804, 810, and the applications 816, 818 which run on the individual device 804, 810. The dynamic policy enforcement engine 822 may exercise control over the operating system 812, 814 by sending requests to the operating system 812, 814, by sending responses to requests made by the operating system 812, 814, or both. The dynamic policy enforcement engine 822 may exercise control over an application 816, 818 by sending requests to the application 816, 818 or to the operating system 812, 814, or by sending responses to requests made by the application 816, 818 or by the operating system 812, 814, or both. The dynamic policy enforcement engine 822 may exercise control over the operating system 812, 814 or the application 816, 818 at any time, including times when the selected policy 828 is created or modified, times when the individual device 804, 810 is started, and times when specified events occur.

Figure 9:
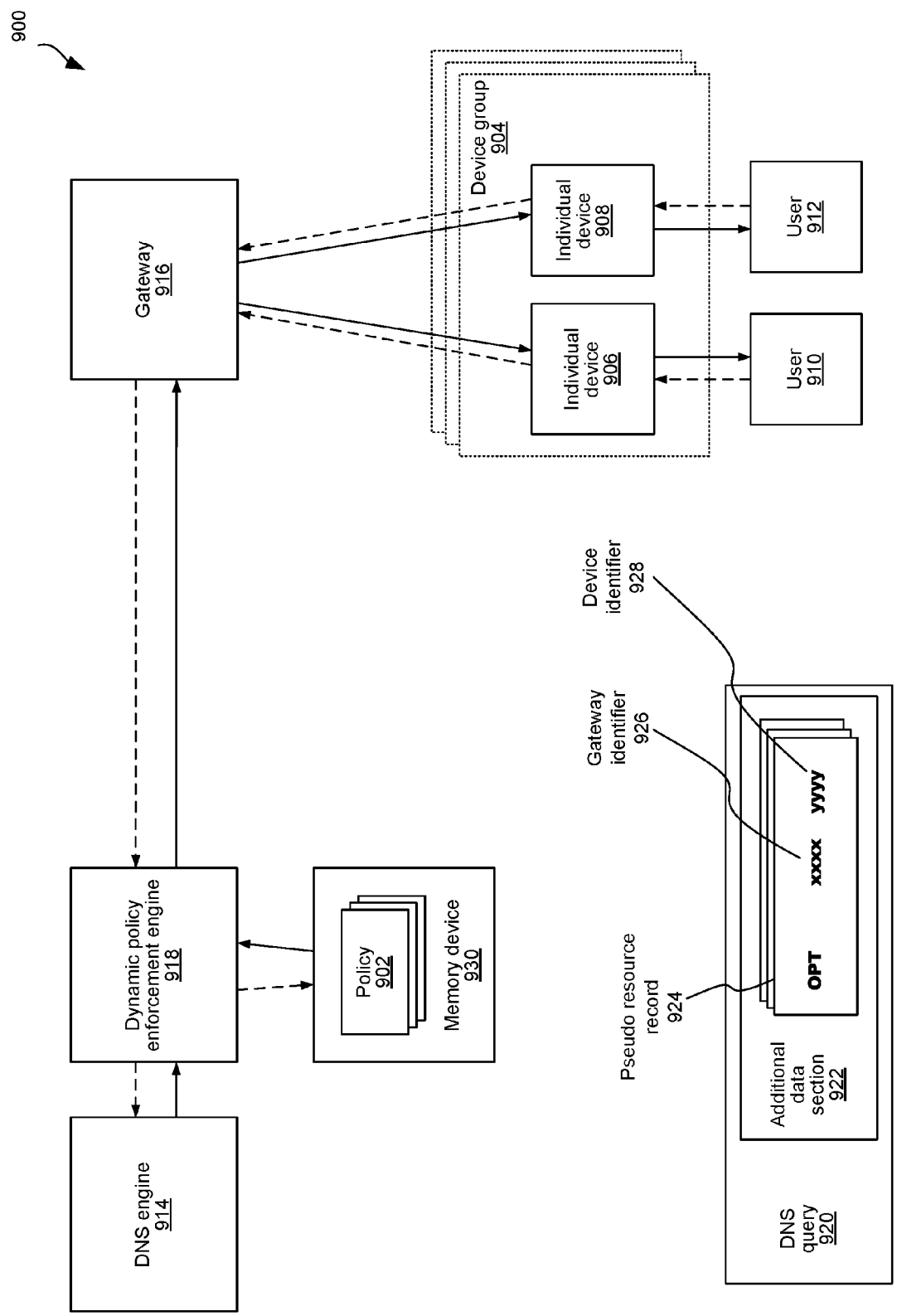
FIG. 9 shows an example of the device control system in which individual devices are classified into groups and policies are applied to groups.

FIG. 9 shows an embodiment 900 of the device control system which associates a policy 902 with a device group 904 rather than with an individual device 906, 908. Each device group 904 contains one or more individual devices 906, 908. An individual device 906, 908, operated by a user 910, 912, communicates with a DNS engine 914 through a gateway 916 and a dynamic policy enforcement engine 918.

Each DNS query 920 transmitted by the gateway 916 contains an additional data section 922. The gateway 916 inserts an additional data section 922 in each DNS query 920 if none is present in the DNS query 920 received from the individual device 906, 908. The gateway 916 inserts a pseudo-RR 924 of type OPT into the additional data section 922. The pseudo-RR 924 contains a gateway identifier 926 which identifies the gateway 916 and a device identifier 928 which identifies the device group 904 to which the individual device 906, 908 belongs. The dynamic policy enforcement engine 918 uses the gateway identifier 926 and the device identifier 928 to identify the device group 904 to which the individual device 906, 908 belongs. The dynamic policy enforcement engine 918 selects a policy 902 that applies to the device group 904 from a memory device 930.

Figure 10:
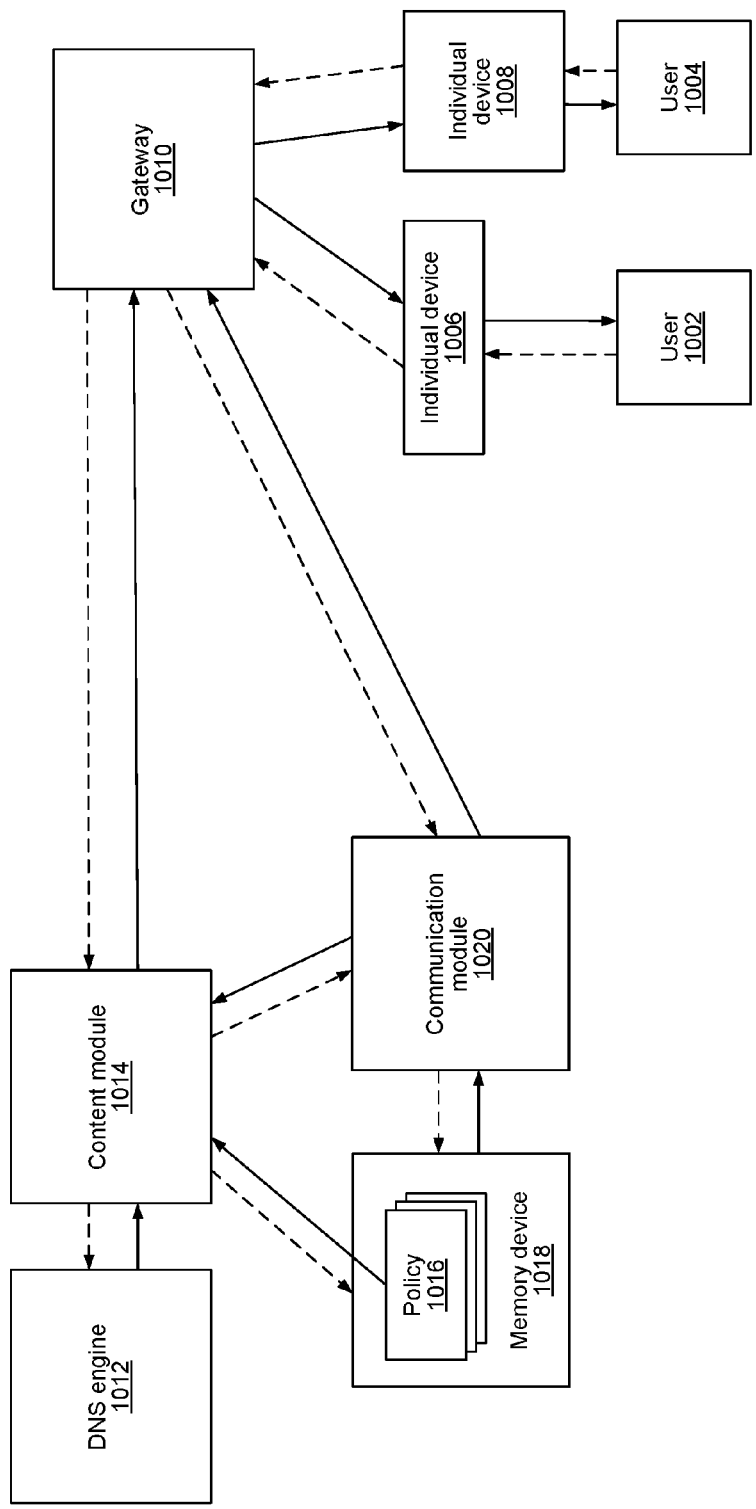
FIG. 10 shows a content selection application of the device control system in which a policy causes a policy-sensitive content server to select content to be delivered to an individual device in response to a content request.

FIG. 10 shows an embodiment 1000 of the device control system which delivers individualized content to individual devices. One or more users 1002, 1004 use one or more individual devices 1006, 1008 to communicate through a gateway 1010. Each DNS query from an individual device 1006, 1008 to a DNS engine 1012 passes through the gateway 1010 and a content module 1014.

When an individual device 1006, 1008 sends the content module 1014 a DNS query that refers to policy-sensitive content, the content module 1014 selects a policy 1016 which applies to the individual device 1006, 1008 from a memory device 1018. The selected policy 1016 may determine what content a communication module 1020 should present to the individual device 1006, 1008. The content module 1014 sends a DNS response to the individual device 1006, 1008 which identifies the content that the communication module 1020 should present. The individual device 1006, 1008 accordingly requests the content from the communication module 1020, and the communication module 1020 presents the content.

In some embodiments the content module 1014 may forward a DNS query that refers to policy-sensitive content to the DNS engine 1012 and modify the DNS engine 1012's response according to the selected policy 1016.

In some embodiments the DNS response which the content module 1014 returns to the individual device 1006, 1008 may identify the selected policy 1016. The communication module 1020 may then retrieve the selected policy 1016 from the memory device 1018 and use it to determine what content to present to the individual device 1006, 1008.

Figure 11:
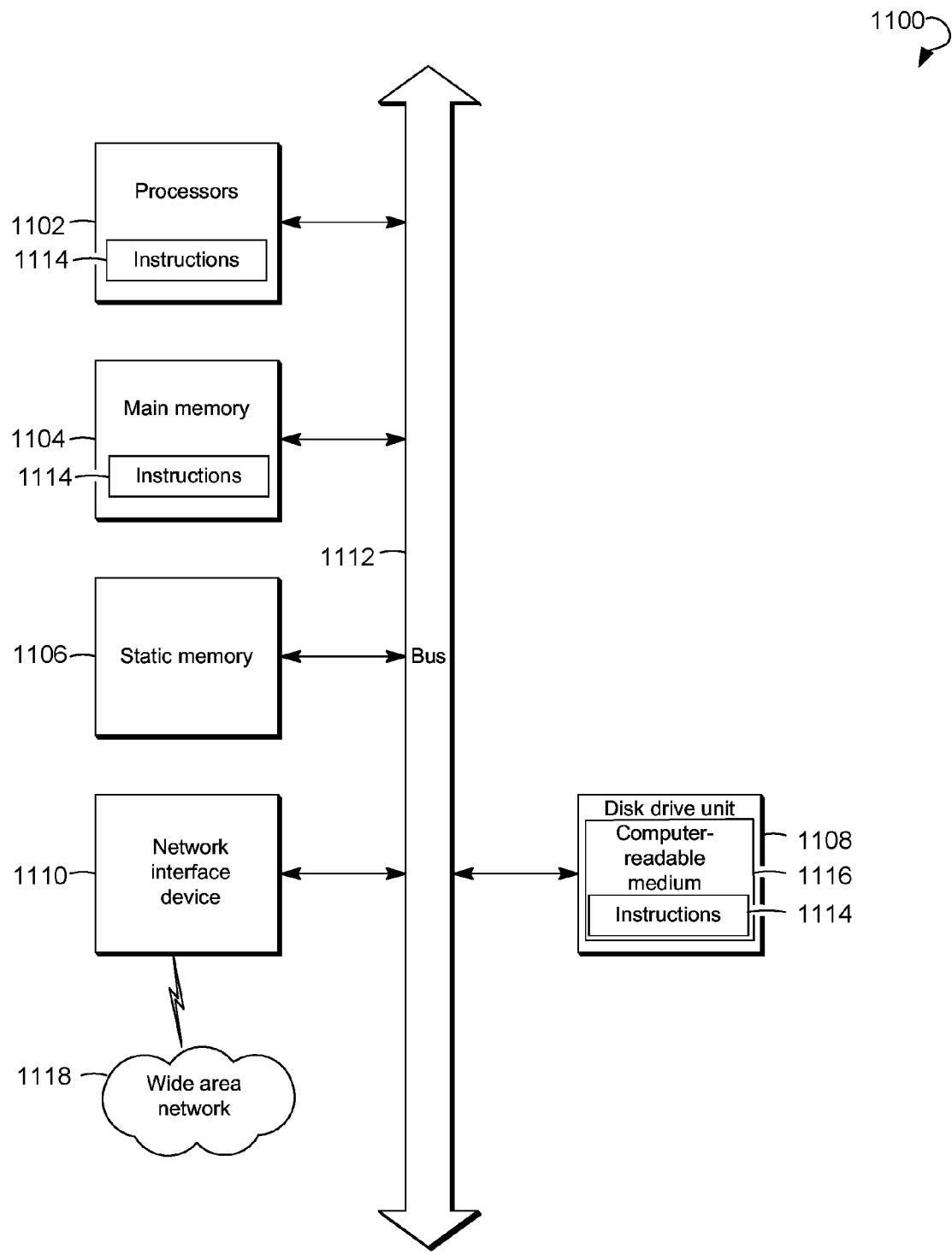
FIG. 11 shows the components of a system for providing DNS-based control of individual devices.

FIG. 11 shows the components of a system 1100 which implements the server side elements of a device control system. The system 1100 comprises one or more processors 1102, main memory 1104, static memory 1106, a disk drive unit 1108, and a network interface device 1110, all of which are communicably attached to a bus 1112. The bus may be any type of hardware or software which enables the attached components of the system 1100 to communicate with each other, such as a local area network or a wide area network.

The processors 1102 perform the functions of the system 1100 by executing instructions 1114 from the main memory 1104, the instructions 1114 being fetched into the main memory 1104 from a computer readable medium 1116 in the disk drive unit 1108.

The network interface device 1110 is attached to a wide area network 1118 through which the system 1100 can communicate with gateways and individual devices.

Many modifications and other embodiments of the example descriptions set forth herein to which these descriptions pertain will come to mind having the benefit of the teachings presented in the foregoing descriptions and the associated drawings. Thus, it will be appreciated that the disclosure may be embodied in many forms and should not be limited to the example embodiments described above.

Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for the purposes of limitation.

The invention claimed is:

1. A system for providing DNS-based policies for devices, the system comprising:
    a DNS engine operable to receive a DNS query from an individual device via a gateway associated with the individual device, the DNS query including at least one of: (i) a unique gateway identifier associated with the gateway and (ii) a unique device identifier associated with the individual device;

a memory device operable to store at least one policy, the at least one policy corresponding to at least one of the unique gateway identifier and the unique device identifier; and a dynamic policy enforcement engine extracting from the DNS query the at least one of the unique gateway identifier and the unique device identifier, the dynamic policy enforcement engine operable to enforce the at least one policy when processing the DNS query by using the unique gateway identifier and the unique device identifier to select the at least one policy which applies to the individual device which originated the DNS query;

the at least one policy including DNS-based tracking of the individual device, the dynamic policy enforcement engine extracting location information for the individual device from the DNS query; and, a tracking module operable to store the location information of the individual device.

2. The system of claim 1, wherein the at least one policy includes blocking content and redirecting the DNS query.

3. The system of claim 1, further comprising a DNS-based communication module operable to deliver a DNS response to the individual device based on the at least one policy, the individual device loading at least one message based on the DNS response.

4. The system of claim 1, wherein the DNS engine is deployed within a cloud-based environment.

5. The system of claim 1, wherein the unique gateway identifier is permanently assigned to the gateway.

6. The system of claim 1, wherein the unique gateway identifier includes an Internet Protocol (IP) address associated with the gateway.

7. The system of claim 1, wherein the unique device identifier is permanently assigned to the individual device.

8. The system of claim 1, wherein the unique device identifier includes at least one of a mac address, a host name, a network control point IP address, a group tag, and a hash of the mac address.

9. The system of claim 1, wherein the unique device identifier is further associated with a group of devices to which the individual device belongs, the dynamic policy enforcement engine being operable to enforce the at least one policy to content delivered to each device of the group of devices.

10. The system of claim 1, further comprising a policy control user interface, the policy control user interface being operable to modify the at least one policy.

11. The system of claim 10, wherein the policy control user interface includes a gateway interface which communicates with the gateway, the at least one policy modified by setting one or more flags on the gateway interface.

12. The system of claim 10, wherein the policy control user interface includes an Internet service provider interface which communicates with an Internet service provider, the at least one policy modified by setting one or more flags on the Internet service provider interface.

13. The system of claim 10, wherein the policy control user interface includes a DNS interface which communicates with the DNS engine, the at least one policy modified by setting one or more flags on the DNS interface.

14. A method for providing DNS-based policies for devices, the method comprising:

with a DNS engine, receiving a DNS query from an individual device via a gateway associated with the individual device, the DNS query including at least one of: (i) a unique gateway identifier associated with the gateway and (ii) the unique device identifier associated with the individual device;

retrieving from a memory device operable to store at least one policy, the at least one policy corresponding to the at least one of the unique gateway identifier and the unique device identifier; and selecting, with a dynamic policy enforcement engine operable and based on the at least one of the unique gateway identifier and the unique device identifier, the at least one policy which applies to the DNS query, and enforcing the at least one policy;

the at least one policy including DNS-based tracking of the individual device, the dynamic policy enforcement engine extracting location information for the individual device from the DNS query; and, storing the location information of the individual device.

15. The method of claim 14, wherein the at least one policy includes redirecting the DNS query.

16. The method of claim 14, wherein the unique gateway identifier includes an Internet Protocol (IP) address associated with the gateway.

17. The method of claim 14, wherein the unique device identifier includes at least one of a mac address, a host name, a network control point IP address, a group tag, and a hash of the mac address.

18. The method of claim 14, further comprising, with an advertisement module, delivering a DNS response to the individual device based on the at least one policy.

19. A system for providing DNS-based advertisements for devices, the system comprising:

a DNS engine operable to receive a DNS query from an individual device via a gateway associated with the individual device, the DNS query including at least one of: (i) a unique gateway identifier associated with the gateway and (ii) a unique device identifier associated with the individual device;

a memory device operable to store at least one advertisement;

a dynamic policy enforcement engine extracting from the DNS query the at least one of the unique gateway identifier and the unique device identifier, the dynamic policy enforcement engine operable to enforce the at least one policy when processing the DNS query by using the unique gateway identifier and the unique device identifier to select the at least one policy which applies to the individual device which originated the DNS query;

an advertisement module operable to trigger, via a DNS response returned to the individual device, delivery of the at least one advertisement based on the at least one policy; and a communication module operable to provide the at least one advertisement to the individual device via the gateway the at least one policy including DNS-based tracking of the individual device, the dynamic policy enforcement engine extracting location information for the individual device from the DNS query; and, a tracking module operable to store the location information of the individual device.

20. The system of claim 19, wherein the advertisement module delivers the at least one advertisement based on historical user actions.

* * * * *